(No Model.)
T. A. EDISON.
MAGNETO OR DYNAMO ELECTRIC MACHINE.
No. 251,550. Patented Dec. 27, 1881.
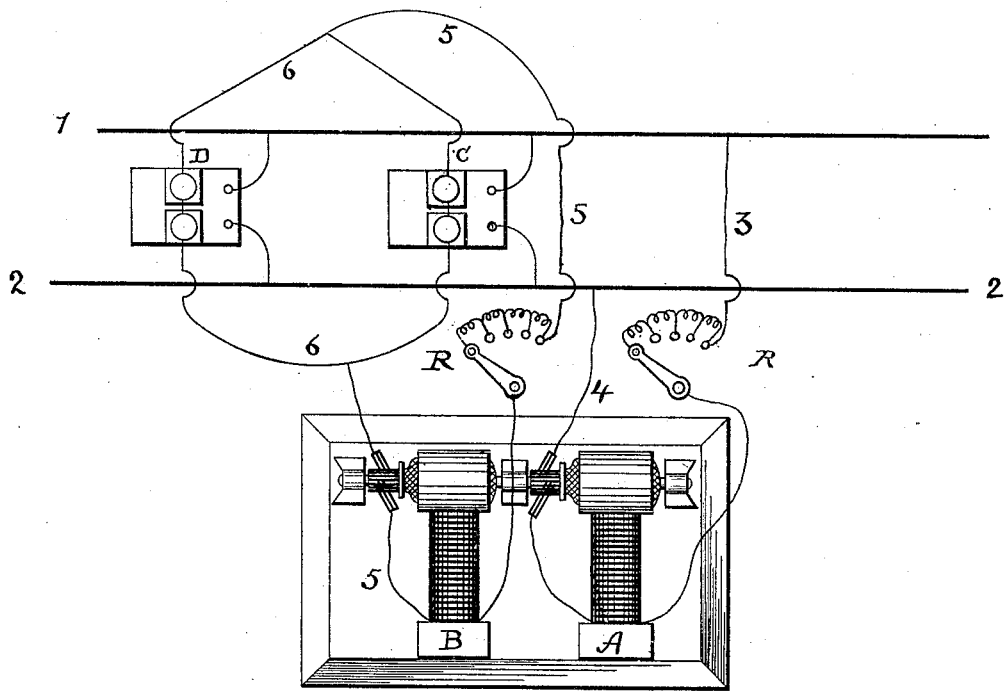
Attest:
Sam D. Mott
Chas. T. Hughes
Inventor:
Thos. A. Edison
Dyer & Wilber
Attys.

UNITED STATES PATENT OFFICE.

UNITED STATES PATENT OFFICE.

THOMAS A. EDISON, OF MENLO PARK, NEW JERSEY, ASSIGNOR TO THE EDISON ELECTRIC LIGHT COMPANY, OF NEW YORK, N. Y.

MAGNETO OR DYNAMO ELECTRIC MACHINE.

SPECIFICATION forming part of Letters Patent No. 251,550, dated December 27, 1881.

Application filed March 3, 1881. (No model.)

*To all whom it may concern:*

Be it known that I, THOMAS A. EDISON, of Menlo Park, in the county of Middlesex and State of New Jersey, have invented a new and useful Improvement in Faradic or Magneto or Dynamo Electric Machines; and I do hereby declare that the following is a full and exact description of the same, reference being had to the accompanying drawing, and to the letters of reference marked thereon.

The object of this invention is to furnish an arrangement of means whereby the field-of-force magnets of a number of Faradic machines may be readily and controllably energized. To this end, in a derived circuit from the main or consumption circuit of the Faradic machines or generators, is placed an electro-motor, which gives motion to a generator whose circuit is, by multiple arc, through all the field-of-force circuits of the generators. In the circuit of the motor is an adjustable resistance, so that its action may be varied, which, in turn, controls the generative capacity of the Faradic machines. In the circuit leading around the field-of-force coils is an adjustable resistance, so that that circuit may be controlled independently, if desired, of the motor-circuit, but with the same ultimate result. This is illustrated in the drawing, in which D C are the Faradic machines or generators, with their bobbins connected in multiple arc to the main or supply or consumption circuit 1 2. These generators D C are driven by any suitable motive power, and in a manner well understood in the art.

In a derived circuit, 3 4, is the motor A, which gives motion to the generator B. In this circuit 3 4 is an adjustable resistance, $r$, so that the amount of current energizing A may be controlled. The motor A gives motion to the Faradic machine or generator B, whose circuit 5 leads by multiple arcs 6 around the field-of-force magnets of C D, energizing them. In this circuit is an adjustable resistance, R, so that, other things remaining equal, the force of the current around the field of C D, and consequently the generative capacity of those machines, may be readily controlled.

Upon the first using of D C as generators their field-of-force coils are connected to any suitable source of energy—for instance, a galvanic battery or to a dynamo or magneto machine, the current from either serving to magnetize their cores. After this first magnetization the cores retain enough residual magnetism to start at least a weak initial current, which excites A, causing B to become active, its current passing through the field-circuit of D C and strengthening it, causing an increased current through 1 and 2 and through A, the increased current in the latter reacting upon the generators themselves, this sequence continuing until the maximum magnetization is attained.

By $r$ A may be so controlled that its speed is varied to cause B to generate current enough only for the magnetization of the field to the degree necessary for the production of current requisite for the demands of the circuit 1 2; or the circuit 3 4 may be left constant and the current through the field-circuit controlled by R to affect and regulate the generative capacity of C D.

What I claim is—

1. The combination, with a battery of Faradic machines, of an electric motor in a derived circuit to the main circuit, and a generator driven thereby and supplying the current for the fields of the battery of Faradic machines, substantially as set forth.

2. The combination of a battery of Faradic generators, a separate generator for supplying the field-current thereto, and an independent motor for the latter, said independent motor being actuated by current from the battery of Faradic generators, substantially as set forth.

This specification signed and witnessed this 26th day of February, 1881.

THOS. A. EDISON.

Witnesses:
S. D. MOTT,
H. W. SEELY.